United States Patent [19]
Borel

[11] Patent Number: 5,221,145
[45] Date of Patent: Jun. 22, 1993

[54] LINEAR BEARING
[75] Inventor: Denis Borel, Sion, Switzerland
[73] Assignee: RMB Roulements Miniatures, Bienne, Switzerland
[21] Appl. No.: 809,520
[22] PCT Filed: Jul. 9, 1991
[86] PCT No.: PCT/CH90/00147
 § 371 Date: Jan. 17, 1992
 § 102(e) Date: Jan. 17, 1992
[87] PCT Pub. No.: WO92/00904
 PCT Pub. Date: Jan. 23, 1992
[51] Int. Cl.[5] .......................................... F16C 29/06
[52] U.S. Cl. ...................................................... 384/43
[58] Field of Search ........................... 384/43, 45, 44; 464/168

[56] References Cited
U.S. PATENT DOCUMENTS
5,046,862  9/1991  Ng ........................................ 384/43
5,051,001  9/1991  Jacob .................................... 384/43
5,069,555 12/1991  Mugglestone et al. ............... 384/43
5,145,260  9/1992  Edelmann et al. .................... 384/43

Primary Examiner—Lenard A. Footland
Attorney, Agent, or Firm—Sprung Horn Kramer & Woods

[57] ABSTRACT

This linear bearing comprises travel circuits for balls (3) which are held by needles (2). Each circuit is formed of passages constituting the longitudinal portions of the circuit and developed in two adjacent modules, these passages being connected at their ends by curved portions. The adjacent modules have resting faces which make it possible to arrange them side by side. A protruding part (23) is introduced into a longitudinal window (6) dimensioned to receive also a needle (2) which is arranged in the cutouts (44 and 45). On the one hand, the needle maintains the balls in their travel circuit and, on the other hand, it holds the modules together.

The modules are obtained by injection in a mold having a single slide operating in a single direction while the balls and needles are parts of known type.

13 Claims, 8 Drawing Sheets

LINEAR BEARING

BACKGROUND OF THE INVENTION

The present invention relates to a ball bearing and, more particularly, a precision linear bearing which can be translated along a shaft and comprises closed travel circuits provided with balls. Each closed circuit comprises two longitudinal portions connected at their ends by curved portions. The balls located in a first longitudinal portion of each circuit support the load of the bearing on the shaft and are recycled, upon translation in the active portion, travelling in the curves and in the opposite direction in the other longitudinal portion.

Such linear bearings frequently replace plan guides and have the advantage of low friction, good precision and long life, although anti-friction bearings are preferable to plain bearings for movements of rotation.

In the prior art there are two main types of configuration of linear bearings, one closed and tubular and the other open, with a longitudinal angular passage provided over the entire length of the bearing and enabling it to operate on a supported shaft.

The bearings known up to the present time are of relatively complicated construction, resulting from the assembling of parts manufactured separately by processes such as turning, swaging, milling, cutting, broaching, with hardening, straightening or other treatments, in which only the balls are readily obtained on the market. Other bearings require very complicated and expensive specific tooling.

Germany Patent No. A-2,116,955 describes a linear bearing formed of an outer sleeve positioning inner parts which form ball circuits and are held in place by the sleeve and by special rings engaged in grooves provided in the sleeve. In the active longitudinal portion, a needle is arranged radially with respect to the balls in contact with the shaft in order to favor the travel of the balls and urge them in the direction towards the shaft. This manner of construction has the drawback of requiring several manufactured parts of different shape and material; furthermore, this embodiment does not make it possible to obtain an open bearing configuration.

Swiss Patent No. 654,886 discloses a linear bearing formed of a solid part which maintains needles above the ball circuits. Although, in this case there is a base construction of needles held on a single piece, this embodiment represents a large investment since the molding equipment is complicated, sensitive and comprises six or even eight rows operating semi-radially in order to obtain all the forms of the element around a bipartite core. Furthermore, this solid construction places the needles in an excessively radially rigid fashion, which creates problems in introducing the bearing in its place and makes difficult an open configuration embodiment which, on the other hand, will deform towards the inside. Furthermore, it is not possible to produce this bearing with a closed outer surface without adding other additional parts.

The prior art also contains other embodiments all of which require special, sophisticated tools. These manners of construction call for substantial investments, in addition to the deficiencies already indicated in the case of open configuration bearings.

SUMMARY OF THE INVENTION

A principal object of the present invention is to overcome these drawbacks and to propose a linear bearing which is economical, although of great precision due to a construction using only parts having identical functions and which are supplemented, namely paired modules, of relatively simple manufacture as well as balls and needles of commercial steel, such as those employed in rotary bearings.

This and other objects of the invention are achieved therefore, by a linear bearing for movement of translation along a shaft, comprising at least one closed circuit containing balls and formed of two longitudinal portions connected at their ends by curved portions, the balls acting on the shaft supporting the load in contact with a needle arranged parallel to the shaft. It is characterized by the fact that each closed circuit is formed of longitudinal passages formed in two adjacent modules arranged longitudinally with respect to the shaft and having in cross section the general shape of a rim segment and by the fact that the adjacent modules are fastened alongside of each other by a needle.

In a preferred embodiment, each module has:
(1) a cutout intended to receive the needle, and
(2) resting surfaces which cooperate with corresponding resting surfaces of an adjacent module.

One of the cutouts being made in a protruding part of a module is adapted to engage in a corresponding opening of the other module, this opening being adjoined by the other cutouts so that the insertion of the needle maintains the balls in the circuit and stabilizes the adjacent modules.

As will be explained further below, the juxtaposition of modules makes it possible to obtain either a closed bearing or an open bearing, having an angle of opening which is variable as a function of the number and type of modules used. It is obvious that it is necessary to provide edge modules on each side of the bearing opening.

In a preferred embodiment, the curved portions of the closed travel circuits have a larger diameter than the center to center distance between the longitudinal circuits by the addition of a rounded circuit portion which is shifted towards the outside of the circuit.

The accompanying drawings show few embodiments of the present invention, by way of illustration and not of limitation.

Figure 1:
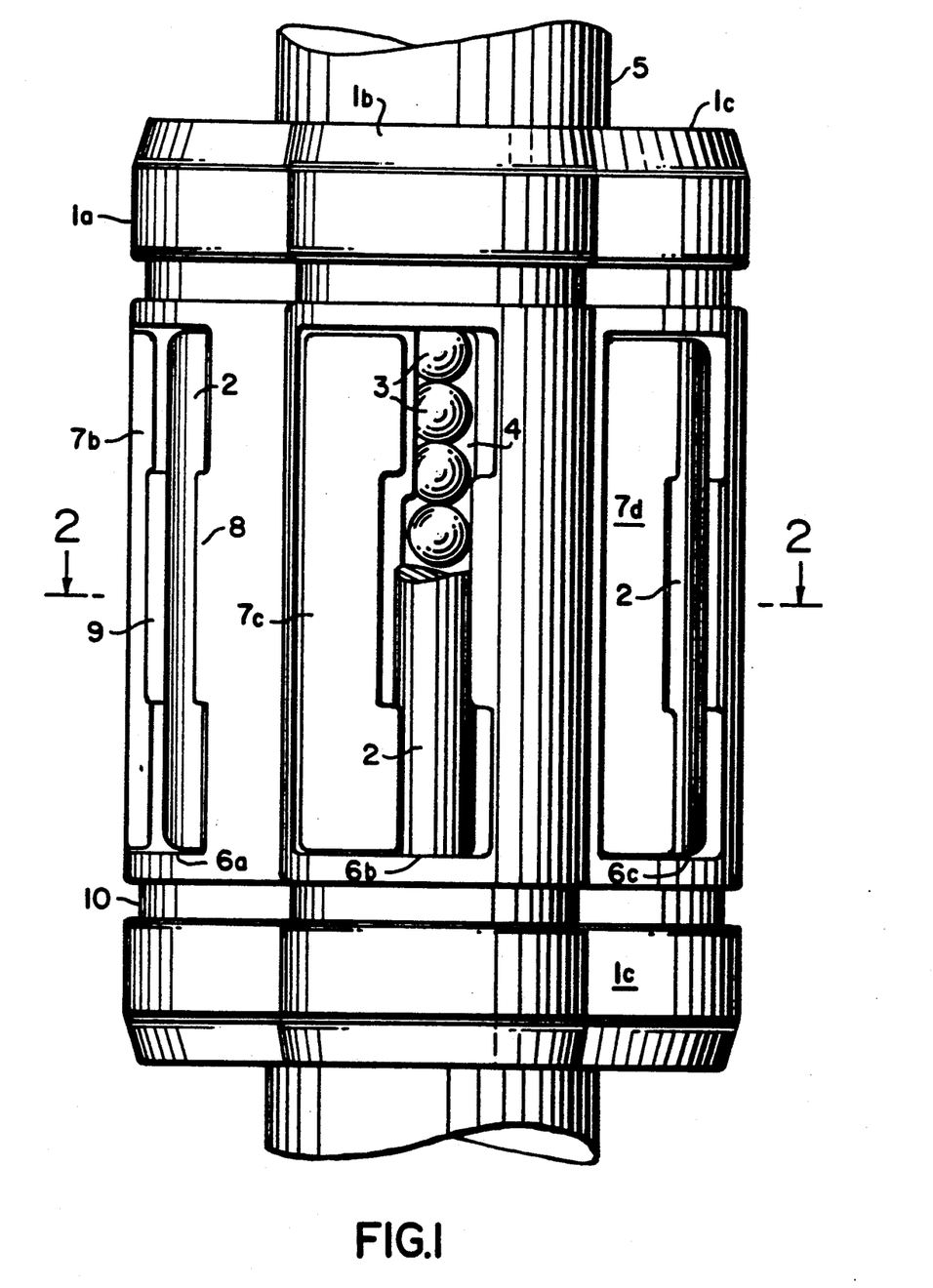
FIG. 1 is a side view of a linear bearing according to the invention wherein one of the needles is partially retracted in order that the balls may be seen.

The bearing shown in FIG. 1 is a bearing formed of six identical modules 1, the adjacent modules 1a to 1c visible being held by engagement of the needles 2 inserted in housings of corresponding shape after having arranged the series of balls 3 in the bearing circuits 4. This bearing is shown around a shaft 5.

For this purpose, each module 1a, 1b, 1c, etc. has an opening 6a, 6b, 6c of a length corresponding to the height of a needle 2 and of a width such that it can receive a needle 2 and a protruding part 7b, 7c, 7d of the adjacent module 1b, 1c, 1d respectively, intended to assure the connection between the modules. In order to assure the fastening of the needle 2 in the opening 6, the opening has over a part of its height a lateral shoulder 8 located facing a bevelled cutout 9 provided in the protruding part 7 of the adjacent module and intended for the insertion of a tool which makes it possible to remove the needle if necessary.

At each end of the bearing there is provided a circular groove 10 which permits the insertion of clips for the fastening of the bearing in a support, not shown in the drawing. On their inside, the modules have at each end cutouts constituting two circular grooves, intended for the possible housing of sealing joints.

Figure 2:
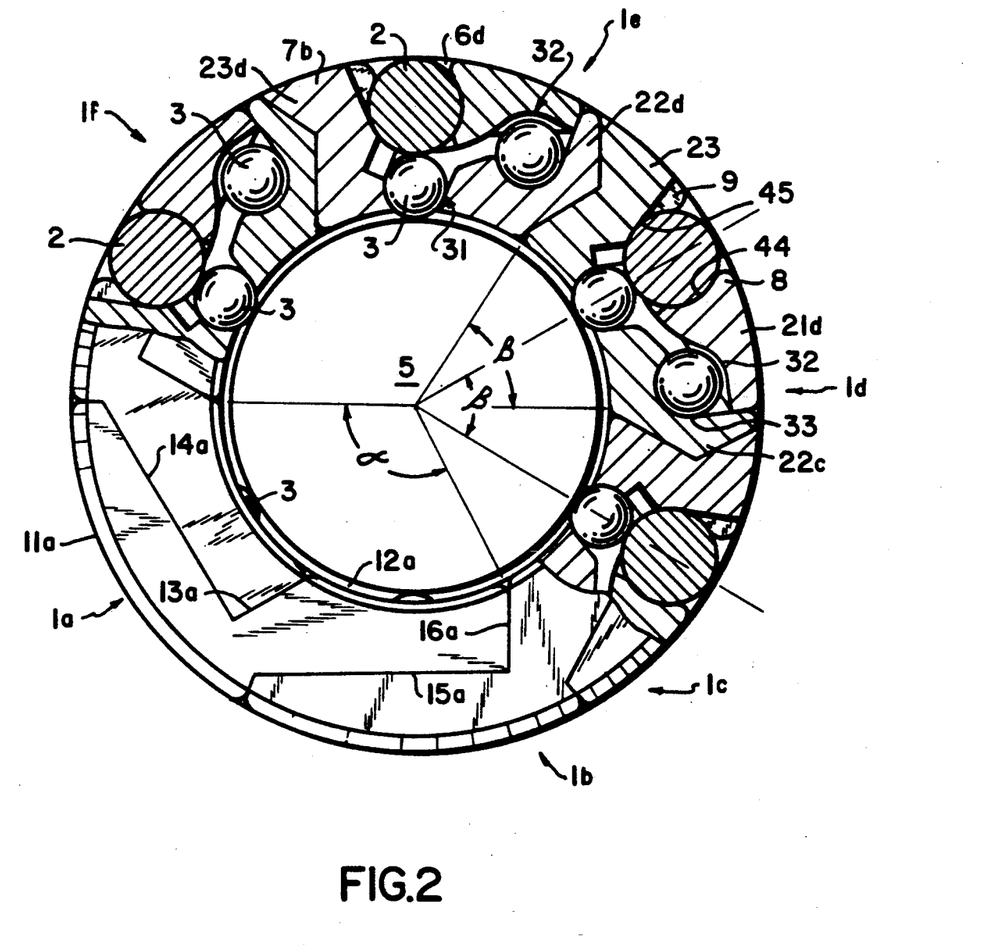
FIG. 2 is a top view, with partial cross section along the line II—II of FIG. 1, of a linear bearing in a closed configuration.

In the top view of FIG. 2 of a linear bearing having six modules 1a to 1f, it will be noted that each module has a shape representing a rim segment. For example, the module 1a has, more precisely, an outer arc 11a and an inner arc 12a which are connected by flat faces 13a and 14a on one side as well as 15a and 16a on the other side, these flat faces constituting the resting faces of two adjacent modules.

In the part of the module shown in section at the level of the openings 6, it will be noted that the module 1d, for instance, is formed of three parts 21d, 22d and 23d respectively, this latter part constituting the protruding parts 7d previously mentioned which engages in the opening of the adjacent module 1e. The division of a module into three parts is due on the one hand to the passage 31, creating the longitudinal portion of the circuit provided for the balls 3 and, on the other hand, to the opening 6d for the needle 2 and the part 23c of the adjacent segment. It will be noted in the sectional part of FIG. 2 that the part 21d comprises the aforementioned shoulder 8, intended to hold the needle 2 in place as well as the beveled cutout 9 provided in the part 23c of the adjacent module. Of course, the longitudinal passage 31 is positioned in such a manner that the balls protrude within the ring formed by the juxtaposition of modules.

The modules are constituted in such a manner that the balls 3 acting on the shaft 5 are, furthermore, in contact with the corresponding needle 2, the needle and the balls being aligned on an axis with is radial with respect to the shaft 5. It is pointed out that the needles 2 have several functions, namely, (1) the fastening of two modules juxtaposed alongside each other;

(2) the maintaining of the balls in their closed circuit; and (3) the formation of a race offering point contact with the balls acting on the shaft and transmitting the load of the bearing.

The closed travel circuit 4 of the balls is such that the active balls roll between the shaft and the needle along the passage 31 constituting the active portion and, after having passed over the rounded connecting portion which will be described in detail below, slide in the opposite direction between the hollow 32 of the part 21d and the hollow 33 of the part 22c, these hollows being parallel to the passage 31 and constituting a longitudinal portion of the circuit of the balls, which is of substantially larger dimension than the diameter of the balls so that the balls move therein as freely as possible. The balls then pass through a second rounded connecting portion before returning along the longitudinal portion 31.

It is to be noted from FIG. 2 that the angle $\alpha$ represents the center angle occupied by a module while the angle $\beta$ constitutes the angle of opening of the inner arc 12. If n represents the number of modules constituting a closed bearing, the center angle $\alpha$ is such that:

$$\alpha \geq 1.5 \times 360°/n, \text{ while } \beta = 360°/n.$$

Figure 3:
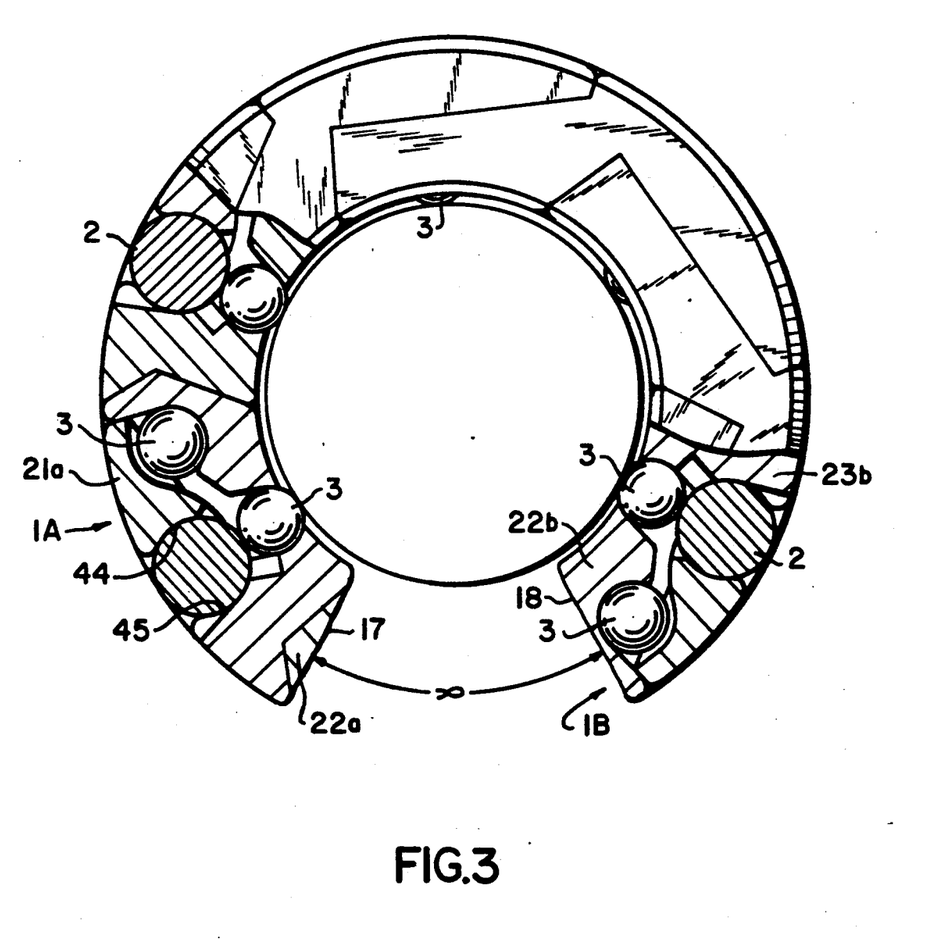
FIG. 3 is a top view, with partial cross section, of a linear bearing in an open configuration of an angle of traditional value.

The linear bearing shown in FIG. 3 is a bearing of the so-called "open" type used to avoid supports holding the shaft. The opening angle $\alpha$ corresponds in the variant shown to the opening angle $\beta$ of the inner arc 12. This opening eliminates one of the needles and the corresponding system of balls. The other modules used remain identical to those previously described, only the modules 1a and 1b being modified, they being indicated by the reference numerals 1a and 1b in the drawing.

The module 1a is cut longitudinally in such a manner that there remains only the part 21a and, in part, its part 22a which is cut by a flat face 17. The module 1b is cut longitudinally in such a manner that there remains only the part 23b and, in part, its part 22b, which is cut by a flat face 18.

In the showing of FIG. 3, the opening angle is about 60°. Depending on the value of the desired angle of opening, one will use a bearing having a number of modules such that the elimination of one or more modules makes it possible to have the required opening.

For example, in order to obtain an opening of 45 while surrounding the shaft over about 315°, there will be used a system comprising eight modules, two of which consist of the modified modules 1A and 1B.

At most, one can conceive of a bearing formed solely of two modules 1A and 1B such as described above and having a single set of balls and a single needle, as will be shown in detail further below.

Figure 4:
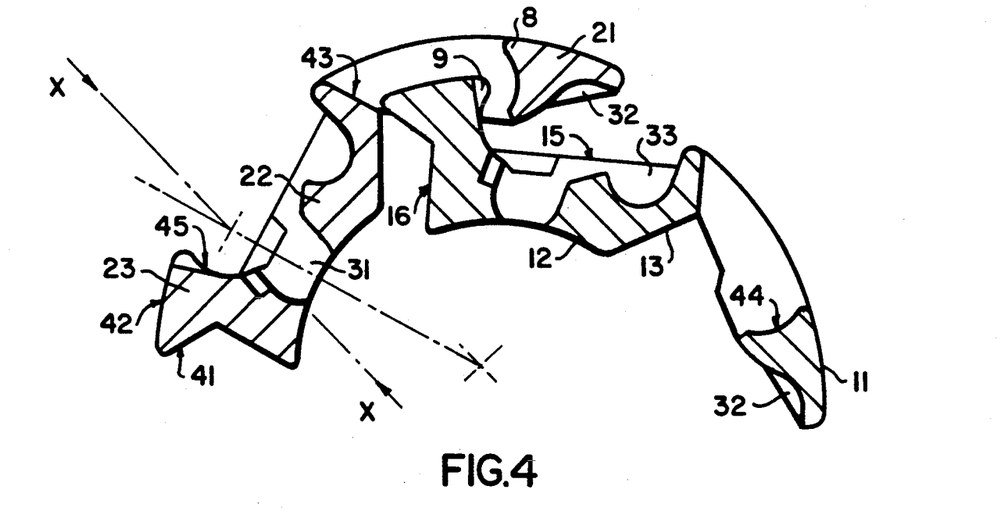
FIG. 4 is a cross section through two adjacent modules during the course of assembly.

In the showing of two modules during the course of assembly shown in FIG. 4, there can be noted:
(1) the outer surfaces 11 to 16 which have been previously described;
(2) the three cut parts 21 to 23, with the shoulder 8 and the beveled cutout 9; and
(3) the longitudinal cutouts 31 to 33 constituting the longitudinal portions of the circuit of balls.

One will note the existence of the resting surface 41 arranged between the flat face 16 and a rounded portion 42 so as to constitute the protruding part 23 assuring the engagement in the neighboring module when the face 41 comes to rest against the flat face 43 adjoining the part 22 and extending between the flat face 13 and the rounding 11. On a part of their height, the modules have rounded cutouts intended to retain the needles. For this purpose, the part 21 is provided with a cutout 44 and the part 23 is provided with a cutout 45.

Referring to FIG. 4, it is seen how two adjacent modules are assembled before the introduction of the balls into the passage 31, so that they occupy their closed travel circuit. The balls are introduced through the housing provided for the needle and are held by insertion of a needle closing the opening 6. The axis X of operation of the injection mold has also been shown in FIG. 4.

Figure 5:
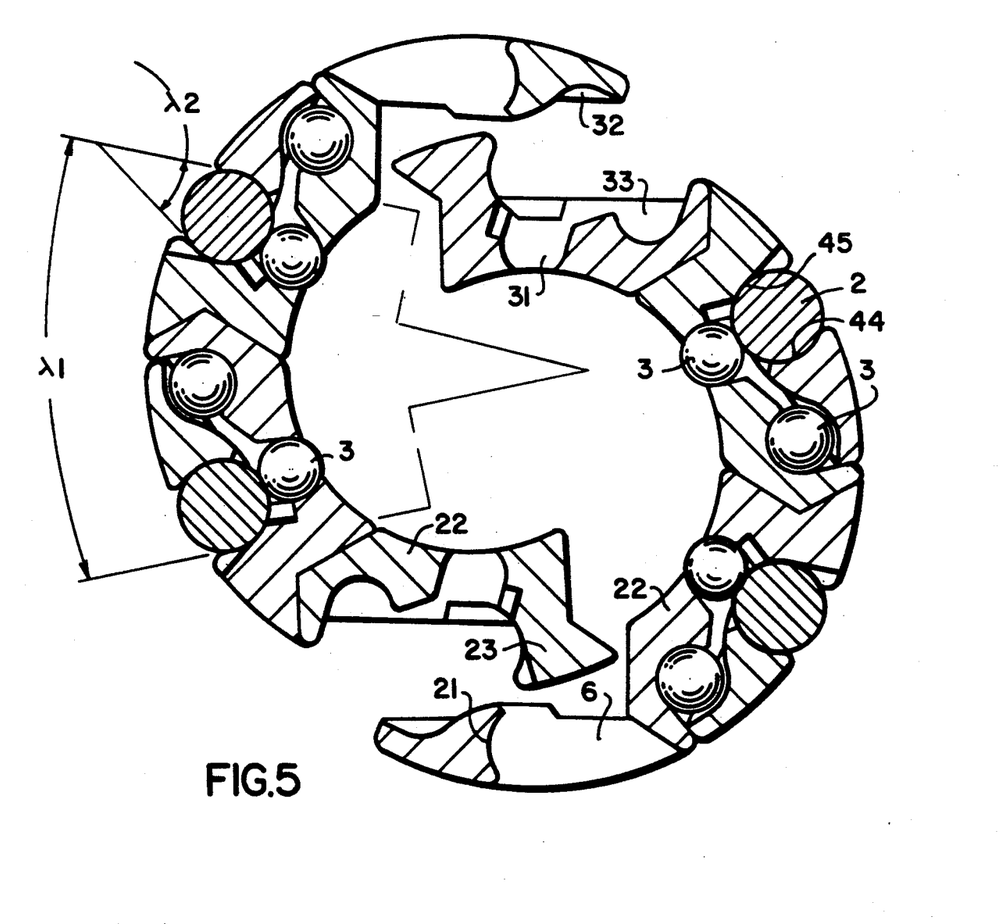
FIG. 5 is a cross section through two groups of modules forming a half-bearing and equipped with needles and balls, before their assembly.

In the example considered here of a bearing form of six modules, the modules are, first of all, assembled 3×3, as shown in FIG. 5, and these two halves are engaged one within the other. It will, furthermore, be noted that, by manufacture, the faces 44 and 45 of a module which are intended to cooperate with a needle form an open angle 1. It is due to the interconnection of two adjacent modules that one obtains a closed angle 2 intended to hold the needle in place. It will also be noted that the face 44, arranged in the drawing to the right of the needle 2, is part of the module arranged to the left thereof, while the face 45, arranged to the left of the needle 2, is part of the module arranged to the right of this same needle, which explains the forces pushing together the modules arranged on either side of the needle. This construction makes it possible to hold the needle precisely above the active balls.

As a variant, all of the modules can be connected together before the introduction of the balls and needles.

Figures 6, 8:
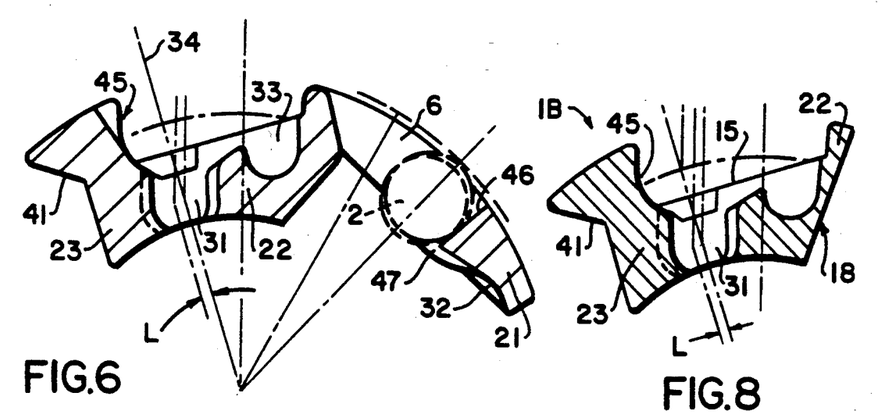
FIG. 6 is a cross section through a variant module having a bridge provided with a cradle which acts elastically on a needle.
FIG. 8 is a cross section through one of the modules located at the edge of the opening in the open configuration of FIG. 2.

The detailed view of FIG. 6 shows a variant module comprising, as previously, a rounded cutout 45 over a part of the height of the window, which otherwise is flat, while a flat cutout 46 is provided on the other side of the needle. Over a part of the height of the opening 6, the flat cutout 46 is boarded on the inside by a cradle 47 intended to place the needle 2 slightly shifted radially towards the outside. The part 21 constitutes an elastic element which makes it possible avoiding deforming the general shape of the bearing towards the outside upon the inserting of the needles or the bearing into its working place. The needle is shown in solid lines on the diameter where it is placed by the cradle 47 and in dash lines on the working diameter defined by the bore diameter where the bearing is placed. Furthermore, this part 21 makes it possible to retain the balls positioned in the inactive longitudinal part.

In FIG. 6, there has also been shown a longitudinal passage 31, indicating the displacement L imparted to the travel path of the balls in the vicinity of the curved parts in a preferred variant. The center of the balls is shifted to the other side of the axis 34 of the passage 31 and of the needle 2 by a value L such that $$\frac{\phi\, ball}{8} \leq L \leq \frac{\phi\, ball}{3.5}$$

Figure 7:
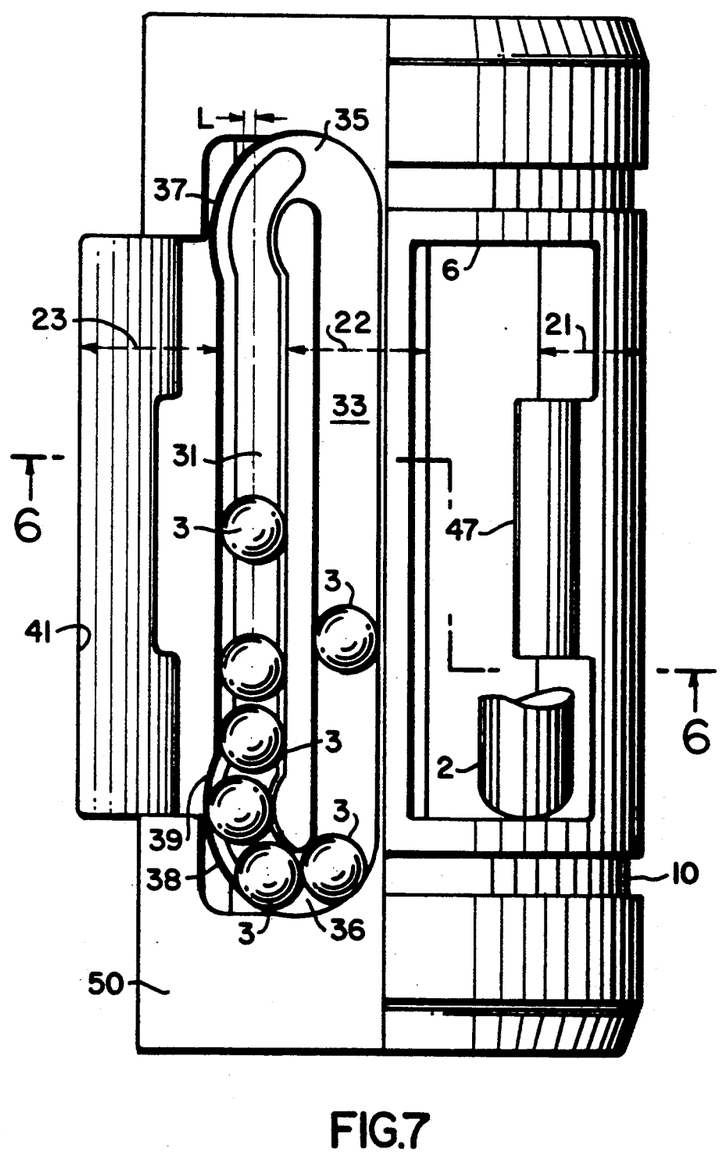
FIG. 7 is a side view of a module such as shown in FIG. 6, with indication of the position of the needle and of the balls in a bearing circuit of preferential shape.

The travel path of the balls is clearly visible in FIG. 7, where there are apparent the three parts 21, 22 and 23 constituting the module in its central portion and shown in section in FIG. 6. The closed travel path 4 is formed by:
(1) the longitudinal passage 31 separating the parts 22, 23;
(2) curved connecting parts 35 and 36; and
(3) the longitudinal passage 33 provided in the part 22, respectively.

In certain embodiments, the curved portions 35 and 36 are semi-circular and directly connect the longitudinal portions 31 and 33. In the variant of FIGS. 6 to 14, the curved portions 35 and 36 provide curved passages 37 and 38 forming a connection with the longitudinal passages 31 and 33. The curved passages 37 and 38 are arranged at a height h on the two ends of the passage 31 and are displaced by the value L from the side opposite the longitudinal passage 33. This variant makes it possible to obtain a larger radius for the connection between the parallel longitudinal passages 31 and 33. It, furthermore, has the advantage of placing the balls at the entrances to the loading zones more precisely and uniformly, the balls coming laterally between the shaft 5 and the needle 2 from the outer side of the circuit, resting on the wall 39 against which the balls are applied by centrifugal force in the curves.

It will be noted from FIG. 7 that the cradle 47 retains the needle 2 over about half of its length.

The dashed lines shown in FIG. 7 indicate the cutouts made on the inner face of the module, for instance, the cutouts 50 intended to form a circular groove adapted to receive a sealing joint.

Figure 9:
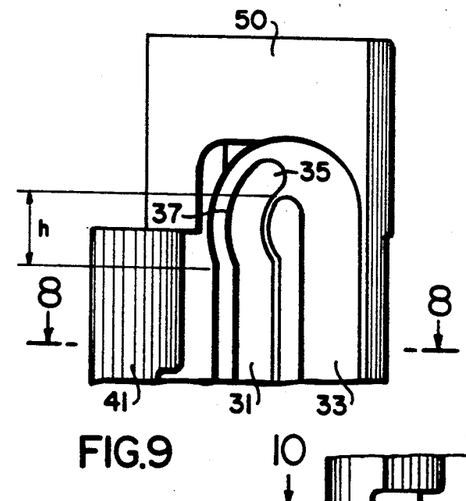
FIG. 9 is a partial side view of the module of FIG. 8.

FIGS. 8 and 9 are similar to FIGS. 6 and 7 and show the module IB of the open bearing configuration of FIG. 3, with the outer edge face 18.

Figure 10:
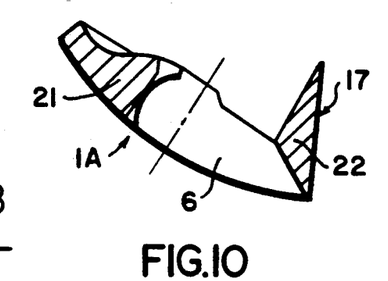
FIG. 10 is similar to FIG. 8 and shows the module located towards the other edge of the opening of FIG. 2.
Figure 11:
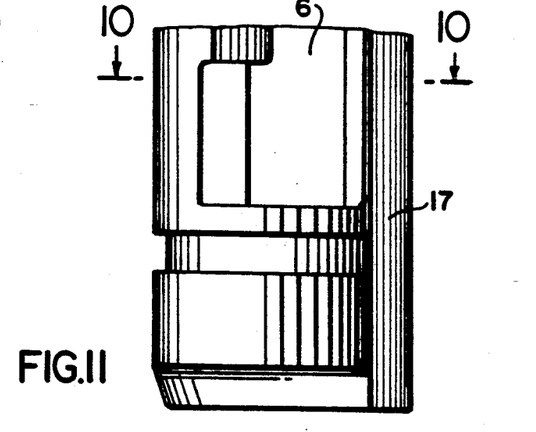
FIG. 11 is a partial side view of the module of FIG. 10.

Similarly, FIGS. 10 and 11 show the edge module IA, with its outer face 17.

Figure 12:
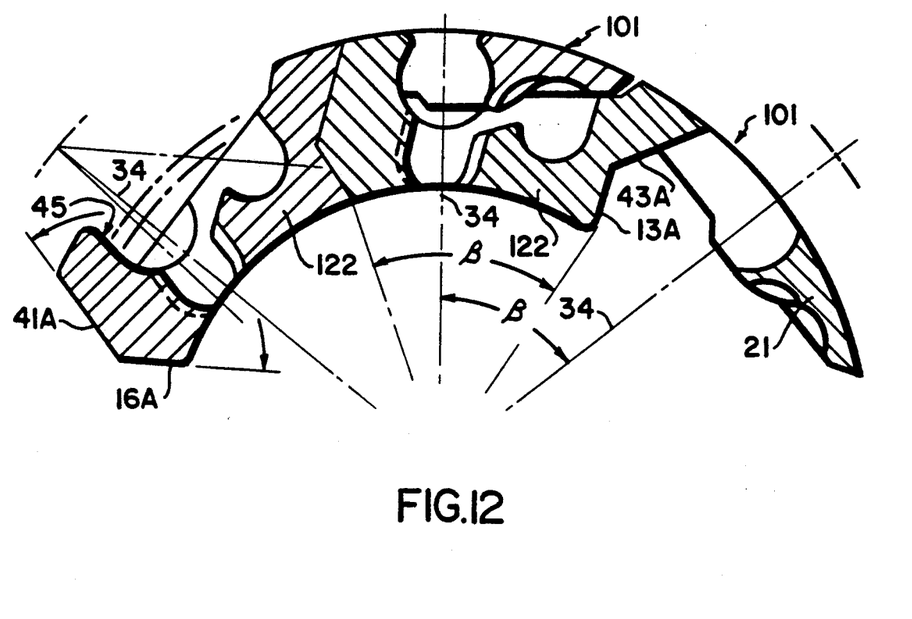
FIG. 12 shows, in cross section, a preferred variant of two adjacent modules in a closed bearing configuration based on seven modules.
Figure 13:
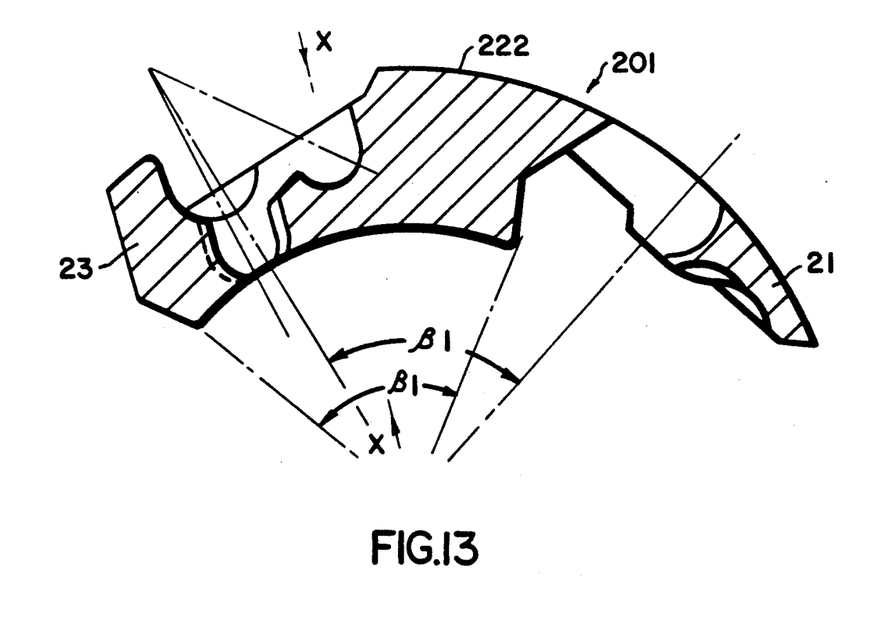
FIG. 13 shows, in cross section, a variant module for a closed bearing configuration formed of five modules.

FIG. 12 is an example of two modules 101 used in a closed configuration formed of seven identical modules, while the module 201 of FIG. 13 is a variant module for a closed configuration with 5 modules. In these two cases, the respective values of the angle $\beta$ are, therefore, about 51° and 72°. It will be noted that it is the central part 122 or 222 which is narrower and wider, respectively, in order to permit the juxtaposition of modules of different types. It will easily be understood that in this way it is possible in this way to obtain from the three types of modules 1, 101 and 201 open bearings the opening angle of which can be varied depending on the modules selected for use.

The angle $\beta 1$ of the module shown in FIG. 13 is preferably such that, for a center angle $\beta$ of the adjacent module of $$\beta = 360°/n\beta 1 = 360°/(n-2)$$

in which n is the number of modules.

In the case of closed bearings, the type of modules 1, 101 or 201 will be selected as a function of the load on the shaft. One can contemplate mounting bearings the load bearing capacity of which is not identical over their entire circumference, by using modules of different openings and arranging the races at the desired places. One can, for instance, combine three modules of a center angle of 60° and four modules of 45°. This manner of procedure is useful also for open bearings in order to provide a greater loading capacity relative to the position of the opening.

It will be noted from FIG. 12 and 13 that the resting places 16A and 41A form an outside angle of the ring segment, while, in the modules previously shown, the resting surfaces 16 and 41 defined an inside angle. The advantage of this variant is that the face 41A is substantially parallel to the edge of the cutout 45 intended to receive a needle, so as to avoid any radial deformation. It is obvious that, in this variant, the corresponding resting faces 13a and 43a are also reversed.

Figure 14:
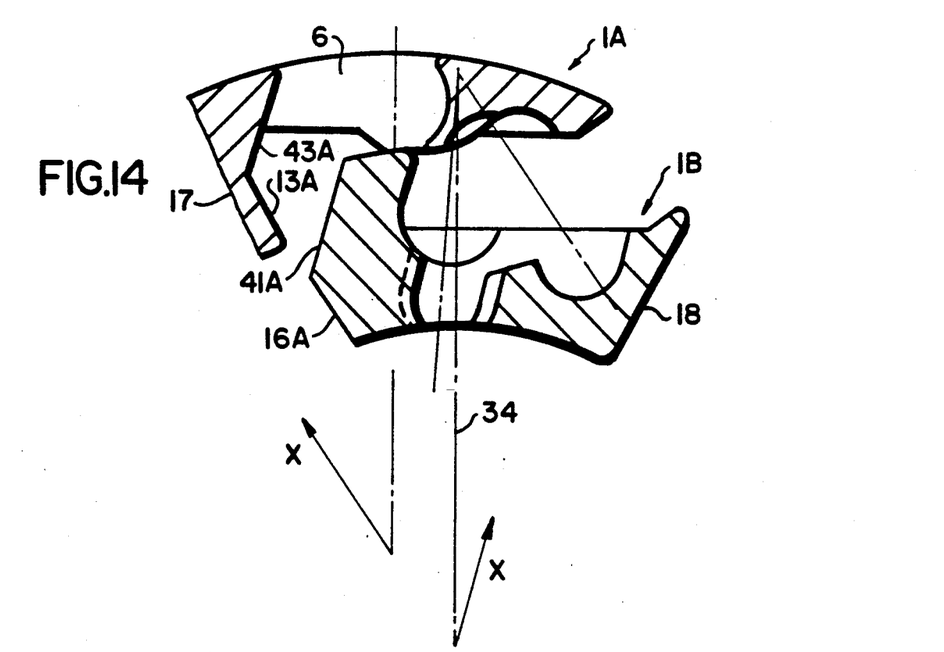
FIG. 14 shows, in cross section, a variant of two adjacent modules during the course of assembly, constituting a bearing with maximum angle of opening.

FIG. 14 shows a bearing which is open over most of the circumference of the shaft, since it has only one element 1A and one element IB as described with reference to FIGS. 8 to 11, but shown here in the variant of an outside angle between the resting faces 16A and 41A. One can also contemplate the use of several pairs of such bearings around a shaft of large size.

Figure 15:
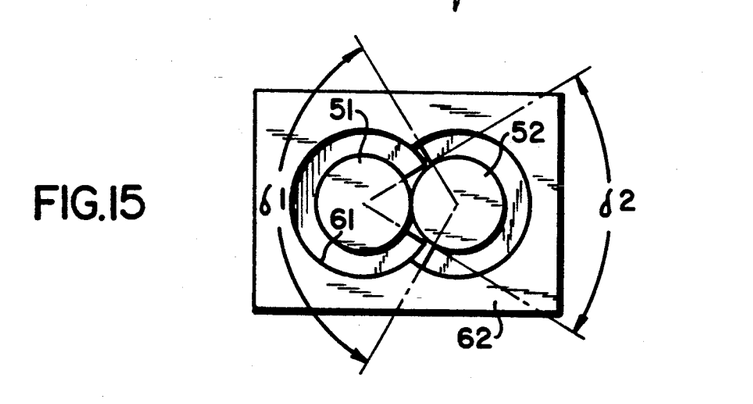
FIG. 15 shows an application of use of two bearings of open configuration having different angles of opening.

FIG. 15 shows the assembly of two open linear bearings intended for the passage of two coupled parallel shafts 51 and 52. The opening angles of the bearings are δ1 and δ2 respectively.

It will, furthermore, be noted that the shaft 51 centers the bearing by three ball circuits while the shaft 52 uses only two balls circuits. In this particular case, it will be noted that it is, therefore, possible to construct bearings without filling all the ball circuits. Due to this possibility, the balls provided in the support 62 require less center-to-center precision.

The bearings are, for instance, fastened in the support 62 by glue points provided solely on the outer parts without contact with the needles, in order to block the bearing without influencing the position of the needles. This detail is particularly important in the version of FIG. 6 comprising needles subjected to the action of deformable cradles 47.

The body of the bearing preferably has a diameter slightly less than the diameter of the bore hole 61 while the needle by their outside generatrix define a diameter which is slightly larger than said hole and, therefore, they are positioned on the diameter of said hole 61 by elasticity of the body of the bearing or in the cradle variant 47 by elasticity of the bridge 21.

Figure 16:
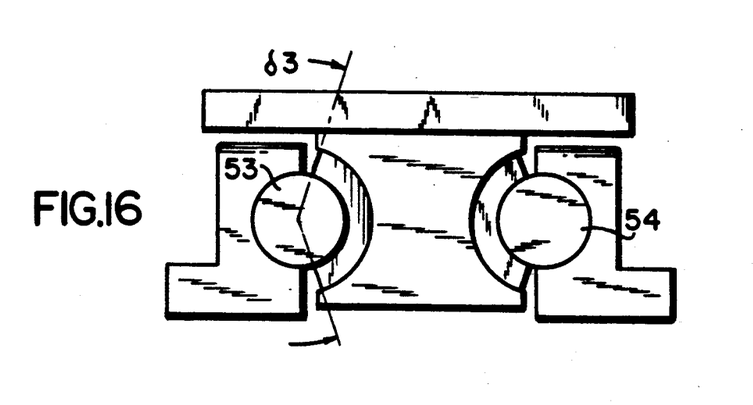
FIG. 16 shows another application using bearings of open configuration having angles of opening of more than 180°.

FIG. 16 proposes, by way of example, a mounting for two parallel shafts 53 and 54 between which two bearings of opening δ3 are arranged.

The bearings shown in the drawing are advantageously produced for shaft diameters ranging from 12 mm to 50 mm.

The modules in accordance with the invention are made of plastic by injection under pressure. Use will be made, for instance, of polyacetyl which, as variant, can be filled with glass. By reason of their particularly simple shape, the modules are obtained in a mold with a single slide operating in a single direction, along the axis X shown in the drawing.

One can also contemplate placing unassembled modules on the market, the user effecting the assembling of the bearings with needles and balls available on the market. If one selects needles and balls of stainless steel, one will, of course, have an anti-corrosion bearing.

It will also be noted, more particularly from FIG. 1, that the bearing described has no openings towards the outside once mounted, which avoids any introduction of foreign particles. In fact, the openings 6 are dimensioned in such a manner that they are plugged by the protruding parts 7 and the needles 2.

It will be understood that the specification and examples are illustrative but not limitative of the present invention and that other embodiments within the spirit and scope of the invention will suggest themselves to those skilled in the art.

I claim:

1. In a linear baring for translational movement along a shaft comprising at least one closed circuit provided with balls and formed of two longitudinal portions connected at their ends by curved portions, the balls acting on the shaft supporting the load in contact with a needle arranged parallel to the shaft, the improvement wherein each closed circuit is formed of longitudinal passages provided in two adjacent modules arranged longitudinally with respect to the shaft and having, in cross section, the general shape of a ring segment, and wherein the adjacent modules are fixed alongside of each other by a needle.

2. A linear bearing according to claim 1, wherein each module has a cutout for receiving the needle, and resting surfaces cooperating with corresponding resting surfaces of an adjacent module; and wherein one of said cutouts is made in a protruding part of a module adapted to engage in a corresponding opening in the other module, said opening being bounded by the other cutout in such a manner that the insertion of the needle maintains the balls in the circuit and firmly holds the adjacent modules together.

3. A linear bearing according to claim 2, wherein the opening is bounded on the outside over a part of its height by a shoulder intended to hold the needle and wherein the protruding part has a bevelled cutout over a height substantially equal to the shoulder.

4. A linear bearing according to claim 3, wherein the opening is bounded on the inside over a part of its height by a cradle integral with the part in order to push the needle towards the outside.

5. A linear bearing according to claim 3, wherein the needles by their outer generatrix define a diameter which is greater than the diameter of the body of the bearing.

6. A linear bearing according to claim 2, wherein the resting surfaces define an outer angle such that the surface forms a minimum angle with the edge of the cutout so as to avoid any radial deformation.

7. A linear bearing according to claim 1, wherein the longitudinal passage over which there is the needle has, close to the curved portions, a curved passage located on the other side of the axis of the passage on the side opposite the longitudinal portion at a distance L such that $$\frac{\phi \text{ ball}}{8} \leq L \leq \frac{\phi \text{ ball}}{3.5}.$$

8. A linear bearing according to claim 1, wherein certain modules having an opening and a protruding part.

9. A linear bearing according to claim 8, wherein the number of circuits corresponds to the number of modules comprising an opening and a protruding part, in order to form a closed bearing.

10. A linear bearing according to claim 8, wherein the number of circuits is less by one unit than the number of modules, in order to form an open bearing the opening angle of which is determined as a function of the number and type of the modules used.

11. A linear bearing according to claim 10, wherein each edge module has a side face.

12. A linear bearing according to claim 8, wherein each module has, in cross section, a ring segment with an outer opening angle $\alpha$ and an inner opening angle $\beta$ which are such that if n represents the number of modules of closed bearing then $$\alpha \geq 1.5 \times 360°/n, \text{ while } \beta = 360°/n.$$

13. A linear bearing according to claim 8, wherein the cutouts of a module define an open angle (1) and wherein the cutouts of two adjacent modules define a closed angle (2) so as to hold the needle precisely above the balls in the passage.

* * * * *